United States Patent
Nussenblatt et al.

(10) Patent No.: US 10,793,264 B2
(45) Date of Patent: Oct. 6, 2020

(54) FLEX BEAM CLAMP FOR ROTOR ASSEMBLY

(71) Applicant: SIKORSKY AIRCRAFT CORPORATION, Stratford, CT (US)

(72) Inventors: Eric Lucien Nussenblatt, Stamford, CT (US); David H. Hunter, Cheshire, CT (US); Justin Thomas, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 358 days.

(21) Appl. No.: 15/322,203

(22) PCT Filed: Jun. 26, 2015

(86) PCT No.: PCT/US2015/037895
§ 371 (c)(1),
(2) Date: Dec. 27, 2016

(87) PCT Pub. No.: WO2015/200757
PCT Pub. Date: Dec. 30, 2015

(65) Prior Publication Data
US 2017/0137121 A1    May 18, 2017

Related U.S. Application Data

(60) Provisional application No. 62/018,062, filed on Jun. 27, 2014.

(51) Int. Cl.
*B64C 27/33* (2006.01)
*B64C 27/48* (2006.01)
(Continued)

(52) U.S. Cl.
CPC .............. *B64C 27/33* (2013.01); *B64C 27/48* (2013.01); *B64C 27/10* (2013.01); *B64C 27/14* (2013.01)

(58) Field of Classification Search
CPC .......... B64C 27/33; B64C 27/48; B64C 27/10; B64C 27/14; B64C 27/32; B64C 27/351
(Continued)

(56) References Cited

U.S. PATENT DOCUMENTS 3,310,119 A    3/1967 Watson
4,244,677 A *  1/1981 Noehren ................. B64C 27/33
                                                    416/134 A
(Continued)

FOREIGN PATENT DOCUMENTS

EP    2730503 A2    5/2014

OTHER PUBLICATIONS

International Search Report and Written Opinion; Application No. PCT/US14/31010, International Filing Date: Mar. 18, 2014; dated Nov. 12, 2014; 12 Pages.
(Continued)

*Primary Examiner* — David Hamaoui
*Assistant Examiner* — John D Bailey
(74) *Attorney, Agent, or Firm* — Foley & Lardner LLP

(57) ABSTRACT

A rotor assembly for a rotary wing aircraft includes a rotor hub having a central axis, the rotor hub rotatable about the central axis. A plurality of flexible structural members extend radially outwardly from the rotor hub, each flexible structural member substantially U-shaped and having a first arm extending from the hub, a second arm extending from the hub, and an end portion connecting the first arm to the second arm at a radially outboard end of the flexible structural member. A clamp member is positioned between the first arm and the second arm of each structural member and secured thereto to tie deflection of the first arm to deflection of the second arm. A rotor blade is secured to each flexible structural member of the plurality of flexible structural members via the clamp member.

17 Claims, 5 Drawing Sheets

(51) Int. Cl.
*B64C 27/10* (2006.01)
*B64C 27/14* (2006.01)

(58) Field of Classification Search
USPC ............... 416/134 A, 131, 134, 135, 140
See application file for complete search history.

(56) References Cited

U.S. PATENT DOCUMENTS

| | | | |
|---|---|---|---|
| 4,601,639 A | 7/1986 | Yen et al. | |
| 4,626,173 A * | 12/1986 | Mouille | B29D 99/0025 |
| | | | 416/134 A |
| 4,898,515 A | 2/1990 | Beno et al. | |
| 5,047,106 A | 9/1991 | Matsumoto et al. | |
| 5,364,230 A * | 11/1994 | Krauss | B64C 27/20 |
| | | | 416/134 A |
| 5,417,549 A | 5/1995 | Purse et al. | |
| 5,738,494 A | 4/1998 | Schmaling | |
| 6,000,453 A | 12/1999 | Davis | |
| 6,113,352 A * | 9/2000 | Certain | B64C 27/33 |
| | | | 416/104 |
| 6,695,583 B2 | 2/2004 | Schmaling et al. | |
| 9,090,344 B2 * | 7/2015 | Stucki | B64C 27/48 |
| 9,708,058 B2 * | 7/2017 | Gaffiero | B64C 27/50 |
| 9,771,152 B2 * | 9/2017 | Thomas | B64C 27/33 |
| 2008/0131280 A1 * | 6/2008 | Krauss | B64C 27/50 |
| | | | 416/131 |
| 2009/0084891 A1 * | 4/2009 | Darrow, Jr. | B64C 27/14 |
| | | | 244/17.19 |
| 2012/0087797 A1 * | 4/2012 | Kuntze-Fechner | |
| | | | B64C 27/473 |
| | | | 416/220 A |
| 2012/0201678 A1 * | 8/2012 | Hunter | B64C 27/33 |
| | | | 416/134 A |
| 2013/0064674 A1 * | 3/2013 | Hunter | B64C 27/473 |
| | | | 416/226 |
| 2014/0241885 A1 * | 8/2014 | Kuntze-Fechner | B64C 27/04 |
| | | | 416/134 A |
| 2014/0286774 A1 * | 9/2014 | Thomas | B64C 27/33 |
| | | | 416/131 |
| 2015/0014476 A1 * | 1/2015 | Parsons | B64C 27/33 |
| | | | 244/17.11 |

OTHER PUBLICATIONS

International Search Report and Written Opinion; Application No. PCT/US2015/037895; International Filing Date: Jun. 26, 2015; dated Sep. 30, 2015; 14 Pages.

* cited by examiner

FLEX BEAM CLAMP FOR ROTOR ASSEMBLY

CROSS REFERENCE TO RELATED APPLICATIONS

This application claims the benefit of PCT Application No. PCT/US2015/037895, filed on Jun. 26, 2015, which in turn claims priority to U.S. provisional patent application Ser. No. 62/018,062, filed Jun. 27, 2014, the entire contents of which are incorporated herein by reference.

BACKGROUND

The subject matter disclosed herein generally relates to rotor assemblies for aircraft use. More specifically, the subject disclosure relates to rotor flex beams for rigid rotor rotorcraft.

A rotary wing aircraft with a coaxial contra-rotating rotor system is capable of higher speeds as compared to conventional single rotor helicopters due in part to the balance of lift between advancing sides of the main rotor blades on the upper and lower rotor systems. To increase rotor speeds and reduce drag, it is desired to place the rotor assemblies of the coaxial rotor system closer to one another along the rotor axis to reduce drag on the system. In some aircraft this results in the use of a rigid rotor system, one without blade flap or blade lead/lag adjustment.

A flex-beam rotor offers a lightweight, cost effective construction for the rotor. In a flex-beam rotor, the assembly includes a rotor hub with a flex-beam arm extending from the rotor hub corresponding to each rotor blade of the rotor assembly. The rotor blade is then secured to the flex-beam arm and supported by one or more bearings. The typical flex-beam rotor, however, lacks a desired flat-wise stiffness (in a plane of rotation of the rotor assembly) to ensure the blades of the coaxial rotors do not collide, and also to provide a desired level of rotor vibratory response.

BRIEF SUMMARY

In one embodiment, a rotor assembly for a rotary wing aircraft includes a rotor hub having a central axis, the rotor hub rotatable about the central axis. A plurality of flexible structural members extends radially outwardly from the rotor hub. Each flexible structural member is substantially U-shaped and has a first arm extending from the rotor hub, a second arm extending from the rotor hub, and an end portion connecting the first arm to the second arm at a radially outboard end of the flexible structural member. A clamp member is located between the first arm and the second arm of each structural member and secured thereto to tie deflection of the first arm to deflection of the second arm. A rotor blade is secured to each flexible structural member of the plurality of flexible structural members via the clamp member.

Additionally or alternatively, in this or other embodiments a rotor blade pin extends through a clamp member opening to secure the rotor blade to the flexible structural member via the clamp member.

Additionally or alternatively, in this or other embodiments the flexible structural member is retained in a recessed channel of the clamp member.

Additionally or alternatively, in this or other embodiments the channel includes a liner of a wear preventative material to reduce wear of the flexible structural member at the clamp member.

Additionally or alternatively, in this or other embodiments the channel has a non-circular profile.

Additionally or alternatively, in this or other embodiments the clamp member is formed by assembly of an upper clamp portion to a lower clamp portion, thereby retaining the flexible structural member at the clamp member.

Additionally or alternatively, in this or other embodiments a plurality of fasteners secures the upper clamp portion to the lower clamp portion. A fastener of the plurality of fasteners is positioned radially outboard of a radially outermost extent of the end portion.

Additionally or alternatively, in this or other embodiments a rotary winged aircraft includes an airframe, a drive system located at the airframe; and a rotor assembly of an embodiment located at the airframe and operably connected to the drive system.

In another embodiment, a flexbeam includes a first arm extending from a first end of the flex beam, a second arm extending from the first end of the flex beam and a curved end portion connecting the first arm to the second arm at a second end of the flex beam. A clamp member is positioned between the first arm and the second arm of each structural member and secured thereto to tie deflection of the first arm to deflection of the second arm.

Additionally or alternatively, in this or other embodiments a pin extends through a clamp member opening to secure a blade to the flexbeam via the clamp member.

Additionally or alternatively, in this or other embodiments the flexbeam is retained in a recessed channel of the clamp member.

Additionally or alternatively, in this or other embodiments the channel includes a liner of a wear preventative material to reduce wear of the flexbeam at the clamp member.

Additionally or alternatively, in this or other embodiments the channel has a non-circular profile.

Additionally or alternatively, in this or other embodiments the clamp member is formed by assembly of an upper clamp portion to a lower clamp portion, thereby retaining the flexbeam at the clamp member.

Additionally or alternatively, in this or other embodiments a plurality of fasteners secures the upper clamp portion to the lower clamp portion. A fastener of the plurality of fasteners is positioned radially outboard of a radially outermost extent of the end portion.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
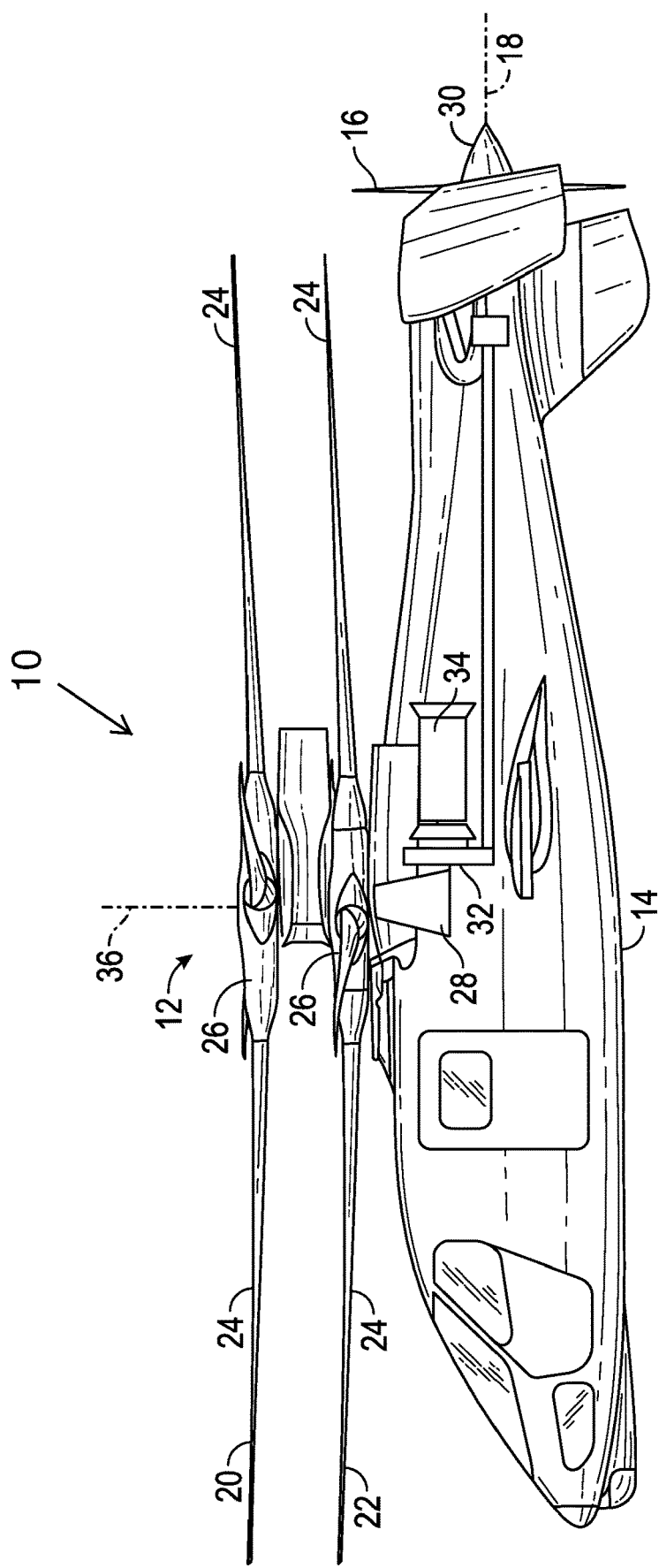
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18.

The main rotor system 12 includes an upper rotor system 20 and a lower rotor system 22 as dual contra-rotating main rotors in a coaxial configuration. A plurality of rotor blade assemblies 24 is mounted to a rotor hub assembly 26 of each rotor system 20, 22. The main rotor system 12 is driven by a transmission 28. The translational thrust system 16 may be any propeller system including, but not limited to a pusher propeller, a tractor propeller, a nacelle mounted propeller, etc. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as turboprops, tilt-rotors, and tilt-wing aircraft, or a conventional single rotor system.

Figure 2:
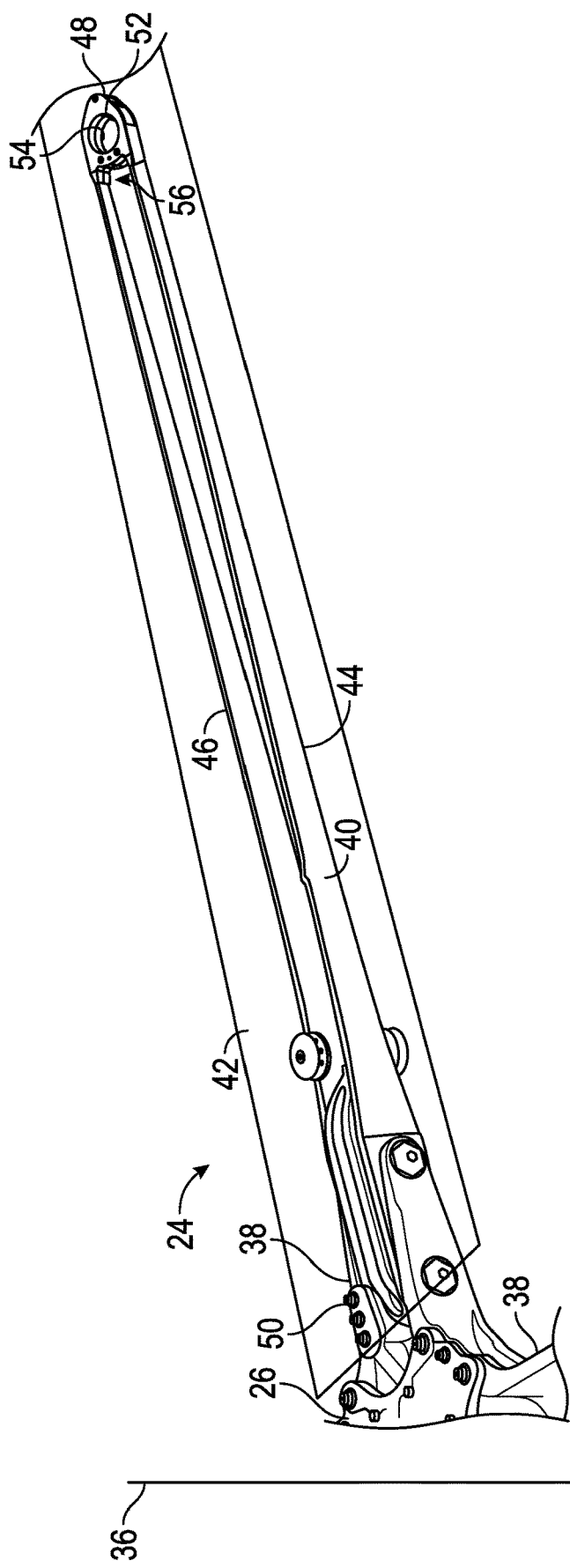
FIG. 2 is a perspective view of an embodiment of a rotor assembly.

Referring now to FIG. 2, the rotor hub assembly 26 is located at, and rotates about, rotor axis 36. The hub assembly 26 includes a plurality of hub arms 38 extending radially outwardly from the rotor axis 36, with a rotor blade assembly 24 secured at each hub arm 38. The rotor blade assembly 24 includes a flexible structural member, in particular a flex beam 40 secured to the hub arm 38 and a rotor blade 42 secured to and supported by the flex beam 40. In some embodiments, the rotor blade 42 has an airfoil-shaped cross-section. The flex beam 40 is substantially U-shaped having a first flex beam arm 44 and a second flex beam arm 46 connected at a beam end 48. The first flex beam arm 44 and the second flex beam arm 46 are secured to the hub arm 38. The rotor blade 42 is secured to the flex beam 40 at inboard bearing 50 located at the hub arm 38 and an outboard connection 52 located at the beam end 48, which in some embodiments is at a substantially mid-span point of the rotor blade 42. While not required in all aspects, the flex beam 40 can be a graphite laminate, although the invention is not limited thereto and can be of metal or other types of composite materials which are flexible.

Figure 3:
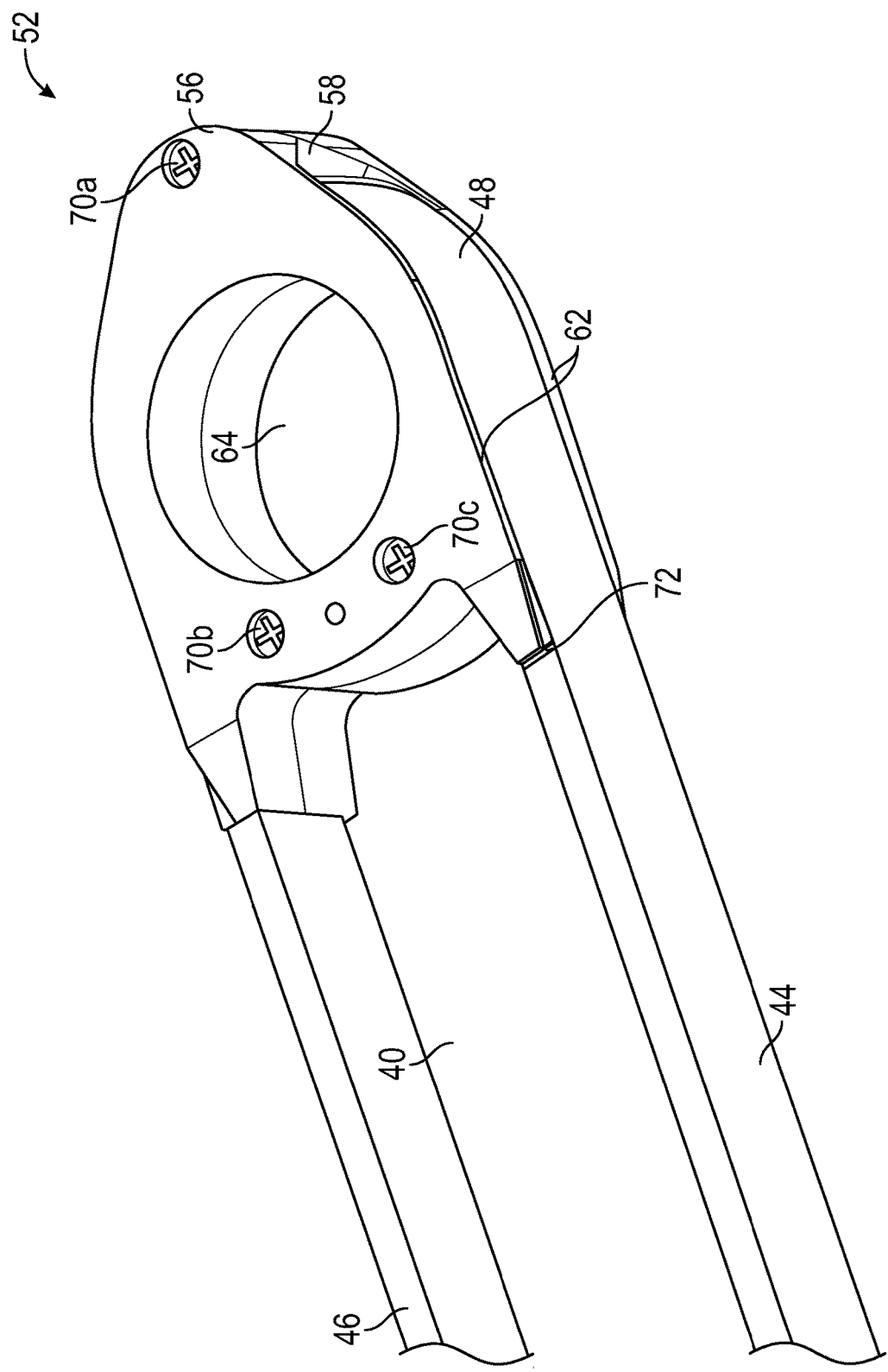
FIG. 3 is a perspective view of an embodiment of a clamp for an end portion of a flexible structural member for a rotor assembly.
Figure 4:
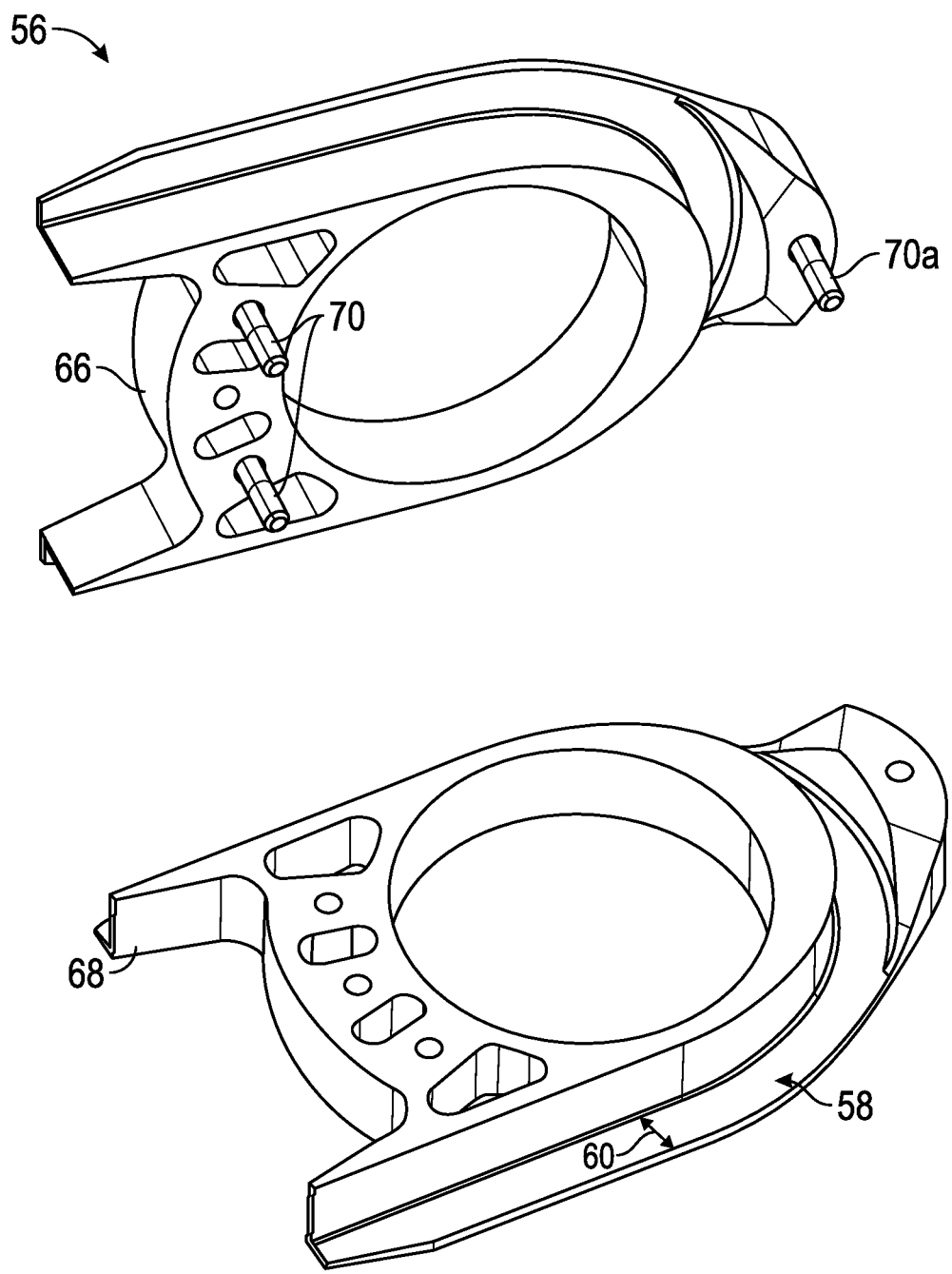
FIG. 4 is a partially exploded view of an embodiment of a clamp for an end portion of a flexible structural member for a rotor assembly.
Figure 5:
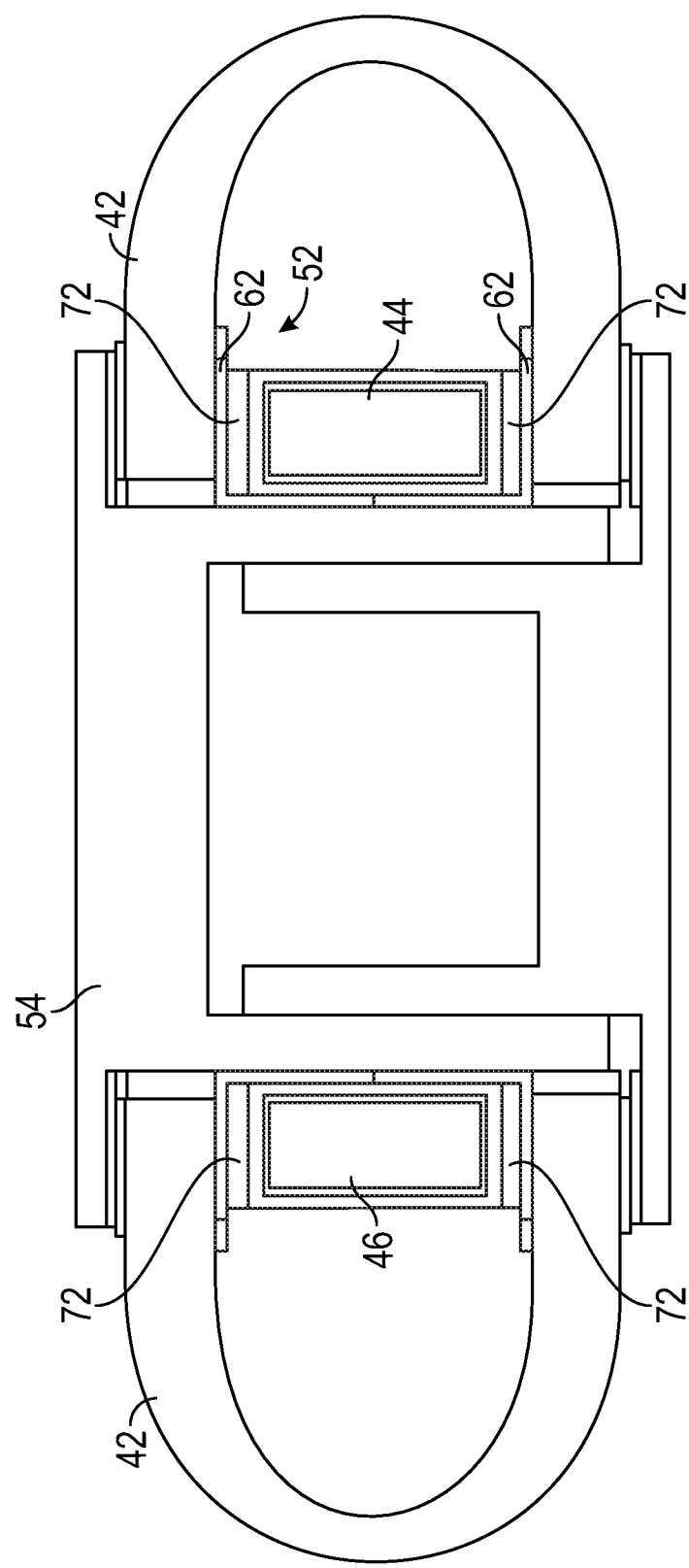
FIG. 5 is a cross-sectional view of an embodiment of a clamp and pin arrangement for a rotor assembly.

Referring now to FIGS. 3-5, the outboard connection 52 includes a rotor blade pin 54 (shown in FIG. 5) extending through a flex beam clamp 56 located between the first beam arm 44 and the second beam arm 46. The flex beam clamp 56 includes a beam channel 58 through which the beam end 48 passes and is wrapped around the rotor blade pin 54. As shown, the clamp 56 includes the entire curved portion of the beam end 48, as well as a tapered portion whereby the arms 44, 46 return to becoming substantially parallel, although the invention is not limited thereto. The blade channel 58 has a channel depth 60 (shown in FIG. 4) sufficient to retain the beam end 48 therein. The channel 58 may be bounded at an upper and lower side by a channel flange 62 to aid in retaining the beam end 48. The rotor blade pin 54 passes through a clamp hole 64 in the flex beam clamp 56. In some embodiments, both the rotor blade pin 54 and the clamp hole 64 are circular, while the beam end 48 wrap has a noncircular profile, while in other embodiments the beam end 48 wrap has a circular profile. With this assembly, the loads of the rotor blade assembly 24 being transferred through the rotor blade pin 54 and into the flex beam 40 via the flex beam clamp 56. Further, the rigid flex beam clamp 56 prevents scissoring, or out of plane motion of the first flex beam arm 44 relative to the second flex beam arm 46. By tying the motion or deflection of the first flex beam arm 44 to the second flex beam arm 46 via the flex beam clamp 56, internal stresses in the beam end 48 decrease significantly allowing the cross-section of the beam end 48 to be reduced.

In some embodiments, the flex beam clamp 56 is a two-piece structure, as shown in FIG. 4, with an upper clamp portion 66 joined to a lower clamp portion 68 by, for example, a number of fasteners 70, such as screws as shown in FIG. 3. The embodiment of FIG. 3 includes three fasteners 70, with an outer fastener 70a located radially outboard of a radial extent of the beam end 48, and the remaining fasteners 70b, 70c, located radially inboard of the radial extent of the beam end 48.

Referring again to FIG. 3, the beam channel 58 may be lined with a wear preventive liner 72, such as a nylon material, to reduce friction between the beam end 48 and the beam channel 58. Further, while in the embodiment shown and described herein, the flex beam clamp 56 is a two-piece structure, it is to be appreciated that such a structure is merely exemplary, and the flex beam clamp 56 may be, for example, a single-piece structure or a multi-piece structure. While not required in all aspects, the clamp 56 can be metallic, although it is understood that other materials and/or composite materials may be used.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plane of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor assembly for a rotary wing aircraft comprising:
a rotor hub having a central axis, the rotor hub rotatable about the central axis;
a plurality of flexible structural members extending radially outwardly from the rotor hub, each flexible structural member being substantially U-shaped and having:
a first arm extending from the rotor hub;
a second arm extending from the rotor hub;
an end portion connecting the first arm to the second arm at a radially outboard end of the flexible structural member;
a rotor blade pin arranged at the end portion between the first arm and the second arm at the radially outboard end;
a clamp member including a first beam clamp coupled to a second beam clamp disposed radially outwardly of the rotor blade pin between the first arm and the second arm of each structural member and secured thereto to tie deflection of the first arm to deflection of the second arm, the clamp member including a beam channel receptive of the end portion and a circular opening receptive of the rotor blade pin;
a flange arranged in the beam channel;
a wear protective liner disposed between the beam channel and the end portion, the wear protective liner being disposed between the flange and the end portion; and
a rotor blade secured to each flexible structural member of the plurality of flexible structural members via the clamp member.

2. The rotor assembly of claim 1, wherein the flexible structural member is retained in the beam channel of the clamp member.

3. The rotor assembly of claim 2, wherein the beam channel has a non-circular profile.

4. The rotor assembly of claim 1, wherein the clamp member is formed by assembly of an upper clamp portion to a lower clamp portion, thereby retaining the flexible structural member at the clamp member.

5. The rotor assembly of claim 4, further comprising a plurality of fasteners to secure the upper clamp portion to the lower clamp portion, a fastener of the plurality of fasteners is disposed radially outboard of a radially outermost extent of the end portion.

6. A rotary winged aircraft comprising:
an airframe;
a drive system disposed at the airframe; and
a rotor assembly of claim 1 disposed at the airframe and operably connected to the drive system.

7. A flexbeam comprising:
a first arm extending from a first end of the flex beam;
a second arm extending from the first end of the flex beam;
a curved end portion connecting the first arm to the second arm at a second end of the flex beam;
a rotor blade pin arranged at the curved end portion between the first arm and the second arm;
a clamp member including a first beam clamp and a second beam clamp disposed radially outwardly of the rotor blade pin between the first arm and the second arm and secured thereto to tie deflection of the first arm to deflection of the second arm, the clamp member including a beam channel receptive of the curved end portion and a circular opening receptive of the rotor blade pin;
a flange arranged in the beam channel; and a wear protective liner disposed in the beam channel between the flange and the curved end portion.

8. The flexbeam of claim 7, wherein the flexbeam is retained in the beam channel of the clamp member.

9. The flexbeam of claim 8, wherein the beam channel has a non-circular profile.

10. The flexbeam of claim 7, wherein the clamp member is formed by assembly of an upper clamp portion to a lower clamp portion, thereby retaining the flexbeam at the clamp member.

11. The flexbeam of claim 10, further comprising a plurality of fasteners to secure the upper clamp portion to the lower clamp portion, a fastener of the plurality of fasteners is disposed radially outboard of a radially outermost extent of the end portion.

12. The rotor assembly of claim 1, wherein the wear protective liner is formed from nylon.

13. The rotor assembly of claim 4, wherein each of the upper clamp portion and the lower clamp portion include a one or more recesses, the one or more recesses being formed in abutting surfaces of the upper clamp portion and the lower clamp portion.

14. The flexbeam of claim 7, wherein the wear protective liner is formed from nylon.

15. The flexbeam of claim 10, wherein each of the upper clamp portion and the lower clamp portion include a one or more recesses, the one or more recesses being formed in abutting surfaces of the upper clamp portion and the lower clamp portion.

16. The rotor assembly of claim 1, wherein each of the first beam clamp and the second beam clamp include a radially outwardly projecting flange, wherein the wear protective liner is arranged between the radially outwardly projecting flange and the curved end portion.

17. The flexbeam of claim 7, wherein each of the first beam clamp and the second beam clamp include a radially outwardly projecting flange, wherein the wear protective liner is arranged between the radially outwardly projecting flange and the curved end portion.

* * * * *